United States Patent [19]
Gross

[11] 3,901,654

[45] Aug. 26, 1975

[54] RECEPTOR ASSAYS OF BIOLOGICALLY ACTIVE COMPOUNDS EMPLOYING BIOLOGICALLY SPECIFIC RECEPTORS

[75] Inventor: Stanley J. Gross, Encino, Calif.

[73] Assignee: Biological Developments, Inc., Encino, Calif.

[22] Filed: June 21, 1971

[21] Appl. No.: 155,261

[52] U.S. Cl. ............ 23/230 B; 23/230 R; 260/152; 424/1
[51] Int. Cl. .......................................... G01n 33/16
[58] Field of Search ......... 23/230 R, 230 B, 253 TP

[56] References Cited
OTHER PUBLICATIONS

Winkler, Biochemistry, Vol. 8, No. 6, pp. 2586–2590 (June 1969), Qp501B52.

Peng, Analytical Chemistry, Vol. 32, No. 10, pp. 1292–1296 (September, 1960).

Lefkowitz et al., Proc. Nat. Acad. Sci., Vol. 65, No. 3, pp. 745–752 (March 1970).

Jensen et al., Proc. Nat. Acad. Sci., Vol. 59, pp. 632–638 (1968).

*Primary Examiner*—Joseph Scovronek
*Attorney, Agent, or Firm*—Ryder, McAulay, Fields, Fisher & Goldstein

[57] ABSTRACT

This invention relates to novel assays for biologically active substrates employing purified target receptors. The assays comprise fluorescent assays for quenching and enhancement as well as radiochemical assays, employing labeled receptor in one embodiment and labeled substrate in another. Methods for the preparation of these purified receptors are also disclosed.

2 Claims, No Drawings

RECEPTOR ASSAYS OF BIOLOGICALLY ACTIVE COMPOUNDS EMPLOYING BIOLOGICALLY SPECIFIC RECEPTORS

BACKGROUND OF THE INVENTION

1. Field of the Invention

This invention relates to purified receptor compounds* derived from body tissue and to novel methods for the preparation of such receptor compounds. The invention also relates to the use of these receptor compounds in novel fluorometric and radiochemical assays for biologically active substances in body fluids.

*Receptor compounds as used herein, are cellular constituents, derived from body tissue 9such as by differential centrifugation) which are specific targets for pharmacologically active substances, such as hormones or the central nervous system acting drugs. In the following discussion these pharmacologically active substances shall sometimes be referred to as "substrates" which is the current biological usage.

2. Discussion of the Prior Art

Receptor compounds that bind hormones, metabolites, polypeptides and other biologically active compounds found in body fluids have been identified in cytoplasmic and nuclear constituents of respective body tissues. Impure preparations of these receptor compounds have been described and used in conventional biological competition assays. For example, a radiochemical assay of adrenocorticotropic hormone (ACTH) is described in Science, 170: 633–635 (1970). This assay involves labeling the ACTH with $I^{125}$ thereby resulting in significant and undesirable loss of biological activity of the ACTH through radioisotopic damage. Such loss of activity renders in doubt the results of any assay based on labeled ACTH. Furthermore, use of a crude preparation containing the receptor molecule does not preclude the presence of interfering receptors and proteins.

Provision of these receptor compounds in pure form is therefore highly desirable. As will become apparent from the following description, the subject invention provides purified receptor compounds which, because of the novel method of preparation, are also specific* for the compound under assay. As a result unique, simple, yet extremely reliable, fluorescent and radiochemical assays for any biologically active substance having a target receptor compound are also provided.

*The term "specific" as used herein refers to the phenomenon whereby the receptor compound binds a substrate compound to the exclusion of closely related structural analogs of the substrate, e.g., estradiol is distinguished from estriol.

SUMMARY OF THE INVENTION

In accordance with this invention there is provided a method for the isolation of purified target receptor compounds from their respective target tissues. The method comprises preparing a crude mixture, derived from the target tissue containing the receptor compound. This mixture is reacted with a substrate compound which is insolubilized by binding to a solid matrix (as defined hereafter). The substrate is specific for said receptor compound and chemically coupled to the insoluble inorganic or organic matrix through a linking group, e.g. an azo, i.e. —N=N—, or hydrazo, i.e.,

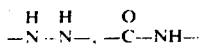

(cyanogen bromide, activated matrix or pseudourea formation). For other examples of linking groups see U.S. Pat. No. 3,519,538, e.g., column 4, lines 9 et seq., illustrating a variety of linking structures (referred therein as "Bond structure") which can be employed herein.

Representative of substrate compounds are the hapten and antigen derivatives disclosed in Gross copending application Ser. No. 89,929, filed Nov. 16, 1970 (e.g., see formulas I at pages 9 and 23). The substrate portion of said insolubilized compound determines the degree of binding to the receptor compound. Receptor compounds and substrates which interact in accordance with this invention by binding to form an insoluble complex containing the receptor compound are herein termed "homologous." The terms "specific or specificity" as used herein refer to such binding or interaction of homologous receptor compounds and substrates to the exclusion of closely related structural analogs of the substrate. For example, estradiol receptor binds estradiol, but does not bind estriol.

The receptor compounds of this invention are useful in the following fluorometric assays for a given substrate compound:

(A) A fluorescent method of assaying quantitatively for a compound specific for a receptor compound which comprises producing a mixture, suitable for fluorometric assay, of (1) a sample to be analyzed, (2) a known quantity of the receptor compound which is biologically specific for the sample compound (substrate) to be assayed, and (3) a known quantity of a fluorescence quenching compound possessing an absorbance spectrum corresponding to the emission spectrum of the receptor, and which is homologous to said sample compound so as to bind with said receptor competitively; and analyzing said mixture for receptor fluorescence quenching.

(B) A fluorescent method of assaying quantitatively for a compound specific for a receptor compound which comprises producing a mixture, suitable for fluorometric assay of (1) a sample to be analyzed, (2) a known quantity of the receptor compound which is biologically specific for the sample compound to be assayed, and (3) a known quantity of a fluorescent compound capable of being enhanced, or polarized and which is homologous to said assay compound so as to bind with said receptor competitively; and analyzing said mixture for fluorescence enhancement or polarization of said fluorescent compound.

The receptor compounds of this invention are also useful in a radiochemical method of assaying quantitatively for a substrate compound specific for a receptor compound, which comprises producing a mixture containing (1) a sample to be analyzed, containing the compound under assay, (2) a known quantity of a radioactive receptor compound biologically specific for the compound to be assayed, and (3) a known quantity of an insoluble compound which is biologically homologous to the compound under assay and which upon interaction with receptor forms a complex therewith, and thereafter subjecting either the free or complexed receptor compound to radioactive counting.

DETAILED DESCRIPTION OF THE INVENTION

Molecules that bind biologically active substances are herein referred to as "receptor compounds." Exemplary of the receptor compounds of this invention are those that bind estradiol-17-beta, testosterone, progesterone, aldosterone, cortisol, and ACTH. These receptor compounds can be derived using conventional techniques from various target tissues as exemplified by the following references: E. V. Jensen et al., Proc. Nat. Acad. Sci. U.S., 59: 632 (1968), R. J. Lefkowitz et al., ibid, 65: 745 (1970), T. S. Herman et al., J. Biol. Chem., 243, 3849 (1968), R. S. Gardner et al., ibid, 244, 4761, (1969). For example, a receptor compound specific for ACTH is contained in the adrenal membrane. Steroid specific receptor compounds can be isolated from the uterus. Testosterone receptor is found in the testes. Insulin receptor can be isolated from the liver. In general any tissue upon which a biologically active substance exerts a direct physiological effect contains a target receptor compound that binds such substance. The method of this invention provides these target receptors in pure form.

Preparation of a crude mixture of the target receptor in general involves homogenization of the target tissue in an aqueous media and recovery of the supernatant therefrom, for example, by filtration or centrifugation. This supernatant contains a crude mixture of the receptor compound and other proteinaceous substances. The supernatant containing the desired receptor compound is then purified in accordance with the novel purification method of this invention by interaction with insolubilized substrates of the following formula:

$$RM$$

where R is a substrate group as defined above, and M is an insoluble matrix, i.e., any insoluble material capable of covalent bonding with said substrate and which does not interfere with the biological activity of the substrate. Such interaction results in the receptor compound being bound to the insolubilized substrate. The receptor is thus isolated from the crude cellular supernatant. The supernatant is removed and the receptor-substrate-matrix complex is then washed. Recovery of the pure receptor complex is effected by cleavage at the substrate-receptor bonds, which does not destroy the specificity of the receptor compound. Exemplary is the use of a urea-acid cleaving agent. It is preferred to employ a mixture of 3 molar urea/1 molar acetic, propionic or hydrocholoric acid (pH ranging between 3 and 4)

The pure receptor compound can then be employed in the novel assays of this invention. These assays employ a receptor compound of this invention, a derivative of the substrate and a sample of the unaltered substrate to be assayed. The derivatized substrate is more fully discussed hereafter, but in general preferably possesses an absorbance spectrum which overlaps the emission spectrum of the receptor compound. The derivatized substrate must also be homologous to the assay substrate (that is, sharing biological specificity) so as to bind with said receptor competitively to the exclusion of close structural analogs of the substrate compound.

One of these assays comprises a fluorescent method of assaying quantitatively for substrate compounds (as defined above) which comprises producing a mixture, suitable for fluorometric assay, of (1) a sample to be analyzed, generally from body fluid (although any sample source can be employed) and containing the substrate compound under assay, (2) a known quantity of pure receptor which is specific for the compound to be assayed, and (3) a known quantity of a substrate derivative, preferably possessing an absorbance spectrum (345 ± 10 nanometers) corresponding to the emission spectrum of the receptor, and which is homologous to said assay compound (that is, sharing structural specificity) so as to bind with said receptor competitively; and analyzing said mixture for fluorescence quenching of receptor.

Exemplary of the substrate compounds which can be assayed are those compounds described in copending application Ser. No. 89,929, filed Nov. 16, 1970, for example, at pages 9–10, 21–23, and 42–43.

The substrate derivatives which can be employed to quench the fluorescence of the receptor are typified by the structures III, V, VI and VII at page 9; VIII, IX and X at page 12; III, V, VI and VII at page 23; I–III at page 29; I–V at page 33, and I–V at page 38 of said copending application Ser. No. 89,929, filed Nov. 16, 1971.

The assay for fluorescence quenching is as follows:

A. Establishment of Standard Curve for Sample to be Assayed

One ml of receptor ($1 \times 10^{-10}$ moles per ml) is added to each of a series of 30 test tubes. To each one of the tubes is also added 1 ml containing concentrations of substrate derivative starting with the first tube with a concentration of $1 \times 10^{-10}$ moles per ml up to the last tube which contains $30 \times 10^{-10}$ moles per ml. Then an optimal mixture, (e.g., $1 \times 10^{-10}$ M/ml) receptor and $6 \times 10^{-10}$ M/ml substrate derivative, are interacted with a ml of competing underivatized substrate, i.e., assay compound, in increasing concentrations (e.g., $1-10 \times 10^{-10}$ M/ml). This mixture is allowed to incubate for 10 minutes to 12 hours at ambient temperature and is then read in a spectrophotofluorometer for fluorescence quenching. Standard tubes contain an equivalent concentration, either of receptor alone or of derivitized substrate alone (diluted in buffer) in the same concentration present when receptor and substrate are mixed together. Excitation is set at 280 nanometers and emission read at 350 nanometers. The sum of the fluorescence emission for derivatized substrate alone at a set concentration and for receptor alone at a set concentration are added. This sum is equal to 100% fluorescence. The actual fluorescence intensity observed upon interaction of receptor and derivatized substrate will read less than 100% because of quenching as a result of the binding of the derivative to the receptor. With increasing concentration of derivatized substrate the observed fluorescence diminishes until derivatized substrate-receptor interaction (or binding) is completed. The difference between the fluorescence of the completely interacted derivatized substrate-receptor mixture and the sum of the fluorescence of derivatized substrate and receptor alone constitutes the percent of quenching. The percent of quenching is proportional to the concentration of substrate derivative.

In assaying a sample of underivatized substrate an optimal standard ratio of derivatized substrate and receptor (e.g., 5–10:1) is selected for use in testing the underivatized sample. The latter (e.g., estradiol) in increasing concentrations per ml, competes with the substrate derivative for binding with a given amount of receptor and will inhibit the quenching phenomenon, permitting fluorescence by receptor bound thereto. The percent of increase in receptor fluorescence caused by binding with underivatized substrate sample is directly proportional to the concentration of the underivatized substrate. The relationship is rendered linear. The more competing unaltered substrate present in the solution, the less fluorescence quenching is caused by the derivatized substrate. Hence a standard curve can be drawn for an unknown solution.

B. Assay for Underivatized Substrate

The solution containing the sample (i.e., underivatized substrate compound as previously described) can be a neutral aqueous solution or body fluid (e.g., serum, urine, amniotic fluid, or tissue extract).

To establish the concentration of the unknown in the body fluid the fluorescence intensity of the sample mixture (containing receptor, derivatized substrate and the unknown) is compared with the aforementioned standard curve. The control for such assay contains no underivatized substrate.

Thus in carrying out the assay a sample of body fluid is obtained and is added (after solids are removed by centrifugation) in dilution to a standard mixture of receptor and derivatized homologous substrate, the latter being present in a molar excess (preferably ranging from 5–10:1) and added last. The resulting solution is allowed to incubate at ambient temperature for about 15 minutes to 12 hours. Thereafter the fluorescence of the resulting mixture is determined, generally by a spectrophotofluorometer. The reading from this instrument (at 350 nm emission) is compared with the standard curve for the compound under assay and translated to the concentration of sample compound present (ng/ml).

Example 1 illustrates the fluorescence quenching assay of this invention for quantitation of a variety of underivatized substrates.

EXAMPLE 1

An aliquot (1–10 ml) of blood is obtained from a patient. Solids are removed by centrifugation. The clear serum is added to a standard mixture of receptor and, lastly added, derivatized homologous substrate (molar ratio 1:6 receptor to substrate). The resulting mixture is incubated at ambient temperature for about 15 minutes. Thereafter the fluorescence of the resulting mixture is measured in an Aminco-Bowman spectrophotofluorometer (correction being made for contribution of buffer and non-specific serum contents as established by the controls). The measured fluorescence intensity is compared with the standard curve for the compound under assay and thereby translated into the concentration of sample compound (substrate) present.

The following Table 1 sets forth the constituents used in each assay for the indicated sample compound in accordance with the method of this example.

TABLE 1

| Sample to be Assayed | Quenching substrate derivatives * | Fluorescent Receptor |
| --- | --- | --- |
| estradiol (17 B) | estradiol azobenzoic acid | estradiol (17B) |
| estriol | estriol azobenzoic acid | estriol |
| estrone | estrone azobenzoic acid | estrone |
| insulin ** | insulin azobenzoic acid | insulin |
| tetrahydrocannabinol (THC) | THC azobenzoic acid | THC |
| thyrotropic releasing hormone (TRH) | TRH azobenzoic acid | TRH |

* see copending application Ser. No. 89,929, filed November 16, 1970, for method of preparation. e.g. Examples 1–3, 9 and 11.
** molar ratio of 1:25 receptor to substrate derivative used in place of 1:6.

Another fluorescence assay forming an embodiment of this invention involves fluorescence enhancement or polarization of a fluorescent substrate derivative of this invention.

This enhancement assay comprises a fluorescence method of assaying quantitatively for substrate compounds, as defined before, which comprises producing a mixture, suitable for fluorometric assay, of (1) a sample to be analyzed, generally from body fluid (although any sample source can be employed) and containing the substrate compound under assay, (2) a known quantity of a receptor which is specific for the compound to be assayed, and (3) a known quantity of fluorescent substrate derivative, possessing preferably an absorbance spectrum (345±10 nanometers) corresponding to the emission spectrum of the receptor and which is homologous to said assay compound (that is, sharing biochemical specificity) so as to bind with said receptor competitively; and analyzing said mixture for fluorescence enhancement or polarization of the substrate derivative.

Exemplary of the substrate compounds which can be assayed using this method are those discussed previously.

The substrate derivatives which can be employed for enhancement of their fluorescence by the antibody are typified by the structures III, V, VI and VII at page 9; VII, IX and X at page 12; III, V, VI and VII at page 23; I–III at page 29; I–VI at page 33, and III–VI at page 38, herein of copending application Ser. No. 89,929, filed Nov. 16, 1970. Of these, structures I–III, page 29; III–V, page 33, and III–V, page 38 are preferred because they are highly fluorescent and because their excitation spectra optimally overlap the emission spectrum of the receptor.

The assay for fluorescence enhancement or polarization is as follows:

A. Establishment of Standard Curve For Sample to be Assayed

One ml of fluorescent substrate derivative ($1 \times 10^{-11}$ moles per ml)* is added to each of a series of 30 test tubes. To each one of the tubes is also added 1 ml containing concentrations of purified receptor starting with the first tube with a concentration of $1 \times 10^{-11}$ moles per ml* of receptor up to the last tube which contains $30 \times 10^{-11}$ moles per ml of receptor. Then an optimal mixture, (e.g., $1 \times 10^{-11}$ M/ml)* substrate derivative (added last) and $6 \times 10^{-11}$ M/ml* receptor are interacted with an ml of competing underivatized substrate, i.e., assay compound, in increasing concentrations (e.g., $1-10 \times 10^{-11}$ M/ml). This mixture is allowed to incubate for 10 minutes to 12 hours at ambient temperature and is then read in a spectrophotofluorometer for fluorescence enhancement or polarization. Standard tubes contain an equivalent concentration, either of receptor or of derivative substrate diluted in buffer, in the same concentration present when receptor and derivative substrate are mixed together. Excitation is set at 280 nanometers or 340 nanometers and emission read at 420±10** nanometers. The sum of the fluorescence emission for substrate alone at a set concentration and for receptor alone at a set concentration are added. This sum is equal to 100% fluorescence. The actual fluorescence intensity observed upon interaction of receptor and derivatized substrate will read greater than 100% because of enhancement as a result of the binding of the derivative substrate to the receptor. With increasing concentration of receptor the observed fluorescence increases until substrate-receptor interaction (or binding) is completed. The difference between the fluorescence of the completely interacted substrate-receptor mixture and the sum of the fluorescence of substrate and receptor alone constitutes the percent of enhancement. The percent of enhancement is proportional to the relative concentration of substrate derivative and receptor. The degree of polarization is calculated in similar fashion.

*for polarization concentrations are 500–1000 x more dilute. **can be high as, e.g. 520 nm (fluorescent).

In assaying a sample of underivatized substrate, an optimal standard ratio of derivatized substrate (e.g., 1:5–10) is selected for use in testing the underivatized sample. The latter (e.g., estradiol) in increasing concentrations per ml, competes with the fluorescent substrate (added last) derivative for binding with a given amount of receptor and will inhibit the enhancement or polarization phenomenon by receptor bound thereto. The percent of decrease in fluorescence enhancement or polarization of substrate derivative caused by binding of receptor with underivatized substrate sample is directly proportional to the concentration of the underivatized substrate. The relationship is rendered linear. The more competing unaltered substrate present in the solution, the less fluorescence enhancement or polarization is caused by the receptor. Hence a standard curve can be drawn for an unknown solution.

B. Assay for Underivatized Substrate

The solution containing the sample (i.e., underivatized substrate as previously described) can be a neutral aqueous solution or body fluid (e.g., serum, urine, amniotic fluid, or tissue extract).

To establish the concentration of the unknown in the body fluid the fluorescence intensity or polarization of the sample mixture (containing receptor, derivatized substrate, and the unknown) is compared with the aforementioned standard curve. The control for such assay is body fluid known to contain no underivatized substrate.

Thus in carrying out the assay a sample of body fluid is obtained and is added (after solids are removed by centrifugation) in dilution to a standard mixture of receptor and derivatized homologous substrate, the former preferably being present in excess (e.g., 5:1). The resulting solution is allowed to incubate at ambient temperature for about 15 minutes to 12 hours. Thereafter the fluorescence of the resulting mixture is determined, generally by a spectrophotofluorometer (with polarization capacity). The reading from this instrument is compared with the standard curve for the substrate compound under assay and translated to the concentration of substrate compound present (mg/ml or ng/ml or pikogram/ml).

Example 2 illustrates the fluorescence enhancement or polarization assay of this invention for quantitation of a variety of underivatized substrates.

EXAMPLE 2

An aliquot (1–10 ml) of blood is obtained from a patient. Solids are removed by centrifugation. The clear serum is added to a standard mixture of receptor and, added last, derivatized homologous substrate (molar ratio 6:1 receptor to substrate). The resulting mixture is incubated at ambient temperature for about 15 minutes. Thereafter the fluorescence of the resulting mixture is measured in an Aminco-Bowman spectrophotofluorometer (corrections being made for contribution of buffer and non-specific serum contents as established by the controls). The measured fluorescence polarization or intensity at 340 nanometers excitation and 420* nanometers emission is compared with the standard curve for the substrate compound under assay and thereby translated into the concentration of sample compound present.

*or higher depending on fluorescent marker's emission maximum.

The following Table 2 sets forth the constituents used in each assay for the indicated sample compound in accordance with the method of this example.

TABLE 2

FLUORESCENCE ENHANCEMENT OR POLARIZATION

| Sample to be Assayed | Enhanced or Polarized Substrate Derivatives* | Enhancing or Polarizing Receptor |
|---|---|---|
| estradiol (17B) | estradiol asobenzoic acid | estradiol (17B) |
| " | estradiol hydrazo benzoic acid | " |
| " | amino estradiol | " |
| estriol | estriol azobenzoic acid | estriol |
| " | estriol hydrazo-benzoic acid | " |
| " | amino estriol | " |
| estrone | estrone asobenzoic acid | estrone |
| " | estrone hydrazo-benzoic acid | " |
| " | amino estrone | " |
| insulin ** | insulin asobenzoic acid | insulin |
| " | hydrazoinsulin benzoic acid | " |
| " | amino insulin | " |
| ACTH | ACTH azobenzoic acid | ACTH |
| " | ACTH hydrazobenzoic acid | " |
| " | amino ACTH | " |

* See copending application - Serial No. 89,929, filed November 16, 1970 for method of preparation, e.g. examples 1B, 1C, 2B, 2C, 3B, 3C, 9A, 9B.
** molar ratio of 25:1 receptor to substrate derivative used in place of 6:1.

Another assay method of this invention comprises radio-receptor methods to assay quantitatively for substrate compounds, such as those previously discussed in connection with the foregoing fluorescent assays, which comprises producing a mixture, suitable for isotope counting assay of (1) a substrate sample to be analyzed, generally from body fluid, (although any sample source can be employed), (2) a known quantity of an isotopically labeled (e.g. $H^3$ )* receptor ($I^{125}$ preferred) which is specific for the substrate compound to be assayed and (3) a substrate derivative, insolubilized by binding to a solid organic (e.g., cellulose derivative) or inorganic (e.g., amino glass) matrix, as previously defined, (preferably pretreated, e.g., with inert proteins, such as albumin, to minimize nonspecific absorption). The substrate derivative is homologous to said assay substrate compound (that is, it shares biological specificity) so as to bind with said receptor competitively. The supernatant from this mixture is analyzed for diminution of counts per minute after incubation; the matrix is especially counted.

*Other labels can be used, e.g., $I^{125}$, $I^{131}$, $C^{14}$, $I^{127}$, $S^{35}$, etc.

The substrate derivatives are covalently coupled to the solid matrix to render them insoluble. These insoluble derivatives compete with homologous underivatized substrate in the sample for receptor. The substrate portion of these coupled derivatives is as previously defined. Illustrative of the coupled derivatives are structures I–IV, page 38 of copending application Ser. No. 89,929, filed Nov. 16, 1970.

The radio-receptor assay using solid phase covalently bonded substrate is as follows:

A. Establishment of Standard Curve

One ml of radioisotopic labeled* receptor (e.g., $H^3$ or $I^{125}$) diluted 1:100 – 1:20,000 is added to each of a series of 20 tubes prepared for isotope counting. To each one of the tubes is also added 1 ml containing 1–10 mg of solid matrix (e.g., glass beads) covalently bound to the substrate. An optimal mixture is selected (i.e., one in which 10–50% of total counts are removed from the liquid phase by insolubilized derivative.) The mixture is interacted with competing underivatized substrate, i.e., assay compound, in increasing concentrations (e.g., 10–100 pikograms/ml). This mixture is allowed to incubate for 1 to 12 hours at 5°–37° C. After separation of clean, insolubilized material, radioactive counts of solid (and liquid) phases are measured in a scintillation counter. Control tubes contain inert protein, uncoupled solid matrix, heterologous insolubilized substrate in the same concentrations.

*If labeling with other radioisotopes (e.g., $I^{125}$) is desired it is exemplified by chloramine T method. Binding sites are protected on a solid matrix.

In assaying a sample of underivatized substrate, optimally labeled (e.g., $10^8$ counts per minute in 0.20 ug/ml) receptor, purified and diluted (e.g., 1:10,000), selected for use in testing the soluble underivatized sample (substrate excess). The latter (e.g., estradiol), in increasing concentrations per ml, competes with insolubilized substrate derivative for binding with a given amount of labeled soluble receptor, will diminish the counts per minute (CPM) removed by insolubilized substrate and increase the CPM remaining in the aqueous phase (by binding with receptor). The percent of increase of CPM in the aqueous phase is directly proportional to the concentration of the underivatized substrate in the test sample. The relationship is rendered linear. The more competing unaltered substrate present in the test solution, the less counts are removed by the covalently insolubilized substrate. Hence a standard curve is drawn for the test compound.

B. Assay for Underivatized Substrate

The solution containing the sample (i.e., underivatized substrate as previously described) can be neutral aqueous solution or a body fluid (e.g., serum, urine, amniotic fluid or tissue extract).

The concentration of the unknown in the body fluid is established by counting radioactivity of the aqueous phase of the sample mixture after competition with insolubilized substrate covalently coupled to glass beads, for binding with labeled receptor. CPM are compared with the aforementioned standard curve. The control for such assay is body fluid known to contain no underivatized substrate.

Thus in carrying out the assay a sample of body fluid is obtained and is added (after solids are removed by centrifugation) in dilution to a standard mixture of receptor and insolubilized homologous substrate, the latter added last, being present in a molar excess. The resulting solution is allowed to incubate at 5°–37°C for 1–12 hours. Thereafter the radioactive counts in the aqueous phase is determined, generally by a scintillation counter. The reading obtained by this instrument is compared with the standard curve for the compound under assay and translated to the concentration of sample compound present (nanograms or pikograms/ml).

Another assay method of this invention comprises radio-receptor methods to assay quantitatively for substrate compounds, as defined previously, which comprises producing a mixture, suitable for isotope counting assay of (1) a substrate sample to be analyzed, generally from body fluid (although any sample source can be employed), (2) a known quantity of an isotopically labeled (e.g., $H^3$) substrate corresponding to said sample substrate (i.e., homologous), and (3) a purified receptor which is specific for the compound to be assayed, insolubilized by coupling or binding to a solid organic (e.g., cellulose derivative) or inorganic (e.g., amino glass) matrix (preferably pretreated, e.g., with inert protein such as albumin, to minimize nonspecific adsorption). The labeled substrate added last being the same as the assay compound, binds with the insolubilized receptor competitively. The supernatant from this mixture is analyzed for diminution of counts (and solid phase analysed separately for aquisition of counts) per minute after incubation.

The purified receptors are coupled to the solid matrix to render them insoluble. The soluble labeled substrate competes with homologous unlabeled substrate in the sample for insolubilized receptor. The substrates which can be assayed are exemplified by those previously discussed.

1. The radio-receptor assay using solid phase bonded purified receptor is as follows:

A. Establishment of Standard Curve

One ml of radioisotopic labeled substrate (e.g., $H^3$) diluted 1:100 – 1:20,000 is added last to each of a series of 20 tubes prepared for isotope counting. To each one of the tubes is also added 1 ml containing 1–10 mg of solid matrix (e.g., glass beads) bound to pure receptor. An optimal mixture is selected (i.e., one in which 40–50% of total counts are removed from the liquid phase by insolubilized receptor. The mixture is interacted with competing unlabeled substrate, i.e., assay compound, in increasing concentrations (e.g., 10–100 pikograms/ml). The final mixture is allowed to incubate for 1 to 12 hours at 5°–37°C. After separation of clean, insolubilized material, radioactive counts of solid (or liquid) phases are measured in a counter. Control tubes contain inert protein, uncoupled solid matrix, heterologous insolubilized receptor and heterologous, soluble substrate in the same concentrations.

In assaying a sample of substrate, optimally labeled (e.g., $10^6$ counts per minute in 0.20 ug/ml) diluted substrate is selected for use in testing the soluble unlabeled substrate sample. The latter (e.g., estradiol), in increasing concentrations per ml, competes with labeled substrate for binding with a given amount of purified, insolubilized receptor and will diminish the counts per minute (CPM) removed by insolubilized purified receptor, thus increasing the CPM remaining in the aqueous phase. The percent of increase of CPM in the aqueous phase is directly proportional to the concentration of the unlabeled substrate in the test sample. The relationship is rendered linear. The more competing unlabeled substrate present in the test solution, the less counts are removed by the insolubilized receptor.

Hence a standard curve can be drawn for the test compound.

B. Assay for Substrate

The solution containing the sample (i.e., substrate as previously described) can be neutral aqueous solution or a body fluid (e.g., serum, urine, amniotic fluid or tissue extract).

The concentration of the unknown substrate in the body fluid is established by counting radioactivity of the aqueous phase of the sample mixture after competition with unlabeled substrate for binding with insolubilized pure receptor. CPM are compared with the aforementioned standard curve. The control for such assay is body fluid known to contain no (or only trace amounts) unlabeled substrate.

Thus in carrying out the assay a sample of body fluid is obtained and is added (after solids are removed by centrifugation) in dilution to a standard mixture of labeled substrate (added last) and insolubilized homologous purified receptor. The substrate is present in a molar excess. The resulting mixture is allowed to incubate at 5°–37°C for 1–12 hours. Thereafter the radioactive counts in the aqueous and solid phases are determined separately, generally by an appropriate isotope gamma or scintillation counter. The reading obtained by this instrument is compared with the standard curve for the compound under assay and translated to the concentration of sample compound present (nanograms, pikograms or pentograms/ml).

I claim:

1. Fluorescent method of assaying quantitively for a compound which is specific for a receptor compound, which comprises producing a mixture, suitable for fluorometric assay, of (1) a sample to be analyzed, (2) a known quantity of the receptor compound in its purified form and which is biologically specific for the compound to be assayed, and (3) a known quantity of a fluorescence quenching compound, possessing an absorbance spectrum corresponding to the emission spectrum of the receptor, and which is homologous to said assay compound so as to bind with said receptor competitively; and analyzing said mixture for receptor fluorescence quenching.

2. The method of claim 1 wherein said fluorescence quenching compound is a fluorescent compound capable of being enhanced or polarized and which is homologous to said assay compound so as to bind with said receptor competitively; and analyzing said mixture for fluorescence enhancement or polarization of said fluorescent compound.

* * * * *